WALL OR DUCT MOUNTED HUMIDISTAT
Original Filed June 10, 1968
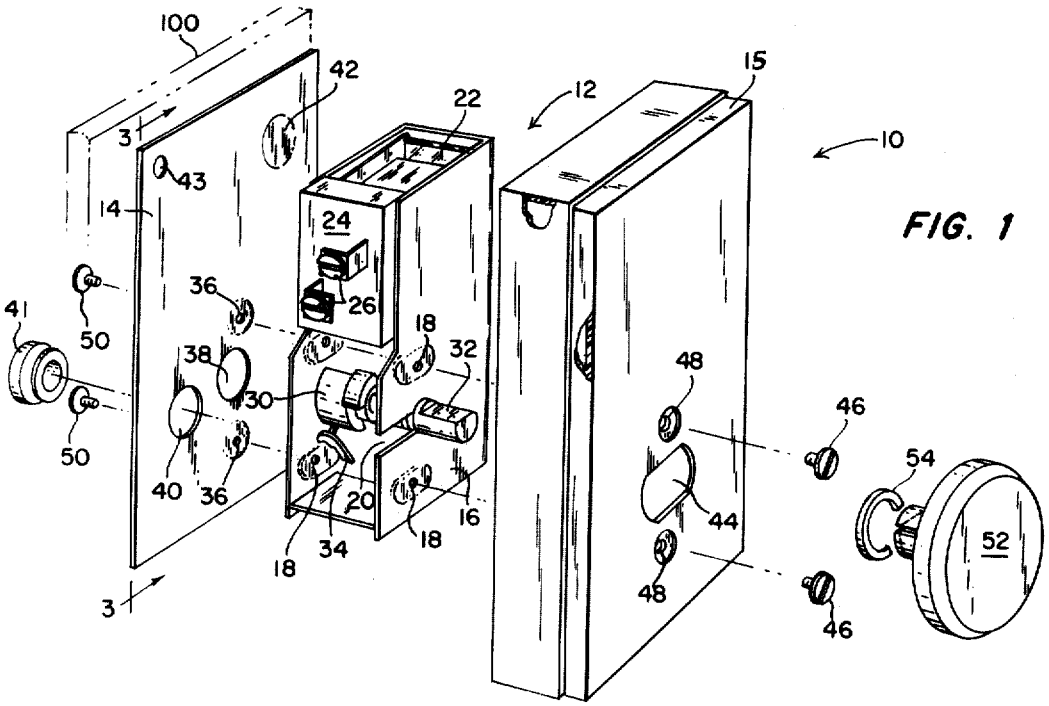
FIG. 1
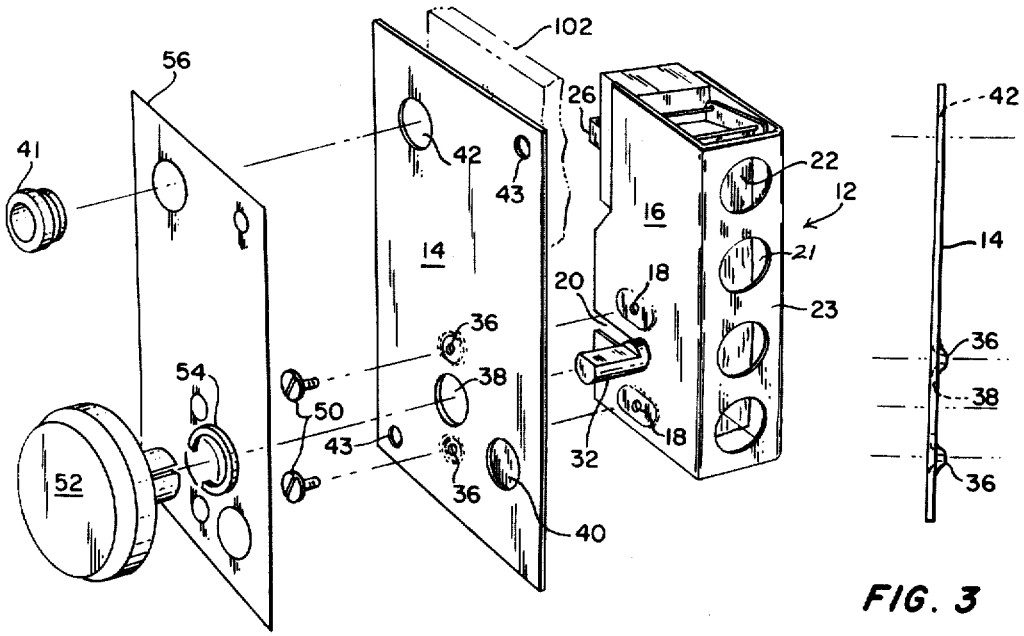
FIG. 3
FIG. 2
INVENTOR.
WALTER R. STILES
BY
Strauch, Nolan, Neale, Nies & Kurz
ATTORNEYS United States Patent Office Re. 28,154
Reissued Sept. 10, 1974

28,154

WALL OR DUCT MOUNTED HUMIDISTAT

Walter R. Stiles, Milford, Mich., assignor to Skuttle Manufacturing Company, Milford, Mich.

Original No. 3,523,217, dated Aug. 4, 1970, Ser. No. 735,854, June 10, 1968. Application for reissue Aug. 25, 1972, Ser. No. 283,860, which is a reissue continuation of abandoned application Ser. No. 123,799, Mar. 12, 1971

Int. Cl. H02b *1/10*

U.S. Cl. 317—120 8 Claims

Matter enclosed in heavy brackets [ ] appears in the original patent but forms no part of this reissue specification; matter printed in italics indicates the additions made by reissue.

ABSTRACT OF THE DISCLOSURE

A humidity control device including a substantially flat base plate and a humidity sensing assembly which may be removably mounted in either forward or reverse positions on the base plate to adapt the control device for use either as a wall mounted or duct mounted humidistat. The base plate has an opening through which and adjusting shaft on the humidity sensing assembly may pass when the device is assembled in an air duct mounting position. In addition, the plate has a plurality of readily removable knock-out plugs with one or another of the plugs being located on the plate to be respectively positioned adjacent electrical terminals on the sensing assembly when it is in either a forward or reverse position. A number of bosses extend from the plate and function to space the sensing assembly therefrom when the parts are assembled as a duct humidistat.

This is a continuation of application Ser. No. 123,799, filed Mar. 12, 1971, now abandoned.

BACKGROUND OF THE INVENTION

This invention relates generally to humidity control devices and more particularly to a universally adaptable humidity control unit which in one manner of assemblage may be used as a wall mounted humidistat and in another as an air duct mounted humidistat.

In the past, manufacturers and distributors of humidistats have found it necessary to produce and stock two separate and distinct types of humidistats, one for wall mounting and another for duct or plenum mounting. This, of course, has rendered manufacturing operations more difficult and complex and increased production and inventory costs.

A conventional wall mounted humidity control unit generally includes a mounting back plate connected to a humidity sensing control device mounted within a cover, with the control device having a short stem extending through the cover permitting an adjusting knob to be connected thereon.

A conventional duct mounted humidistat may include similar structure, but ordinarily has the humidity sensing assembly mounted externally behind the mounting plate and cover and usually includes a long stem or shaft which extends through the plate and hollow cover for attachment to an adjusting knob.

Because of these differences in the various conventional humidistat arrangements, it is necessary for a manufacturer to stock a wide variety of parts including different type covers, mounting plates, and both short and long stems, all of which increase inventory requirements and associated costs.

Also, a secondary particularly annoying problem present in known conventional wall mounted humidistats and overcome by the invention is that existing wall mounting plates make no provision for receiving the screw heads connecting the plate to the control assembly, thus making it necessary to chip away the wall plaster or make the holes for the electrical wires leading from the humidistat to the humidifier or dehumidifier larger so that the humidistat may be mounted flat or level against the wall.

Installation problems have also occurred in the past due to the use of separate humidistats. Generally, when installing a humidifier or dehumidifier in a home, it is most desirable to install a wall mounted humidistat within the living area of the home to make it readily accessible to the home owner for proper adjustment of the humidity level corresponding to outside temperature changes. However, there may be times when the use of a wall humidistat may be very difficult or impossible due to certain type wall constructions or the presence of a plastered ceiling in the basement which would force the use of exposed electrical wiring.

When these difficulties arise, the next best place for installation of the humidistat is in the air duct in the basement or in the furnace area. This location is inconvenient because the home owner must make a special trip to the furnace area each time the humidistat is to be readjusted. Consequently, because of this inconvenience, the home owner usually leaves the duct humidistat set at a very low level and does not readjust it when required. This duct humidistat application also encounters service problems because it is affected by heat from the furnace and moisture from the humidifier if it is installed too close to the humidifier.

Therefore, for apparent reasons, the wall mounted humidistat installation is preferred over the duct installation. However, in the past because the installer was not ordinarily aware of the problems which might be encounted in a particular home, it was necessary for him to carry both wall mounted and duct mounted humidistat assemblies with him on a job. Or, as frequently occurred, the installer would take along only the preferred wall humidistat and discover when he arrived at the house that it could not be installed. Consequently, he would have to return to his place of business to obtain a duct mounted humidistat, which of course caused undue delay and expense.

SUMMARY OF THE INVENTION

The primary object of the invention is to provide a novel, universal humidistat which may be used either as a wall mounted humidistat or as a duct mounted humidistat simply by assembling the respective parts in alternative desired operative arrangements.

Another object resides in the provision of a novel, universal humidistat, the parts of which may be assembled in two different arrangements to enable it to be used either as a wall mounted or duct mounted unit, thus decreasing manufacturing and production costs and reducing inventory and storage space requirements.

Still another object resides in the provision of a humidity control device comprising a humidity sensing assembly having electrical terminals and being removably connectable to a base plate in a forward position for wall mounting and a reverse position for duct mounting. The base plate has a plurality of knock-out plugged apertures at least one of which is used to receive the electrical cable connecting the terminals to the humidifier or dehumidifier when the assembly is in the forward wall mounting position and another is used when the assembly is in the reverse duct mounting position. The base plate is provided with bosses through which attachment screws pass to connect it to the assembly, the bosses functioning to receive the heads of the screws and permit the plate of a wall mount humidistat to be mounted flat against an existing wall. The bosses also compensate for the wall thickness of the air duct and serve to space the assembly from the plate when the assembly is in the reverse duct mounting position in which the plate is connected to the wall of the air duct with the assembly located within the duct. A cover is provided for the wall mounted humidistat arrangement with the humidity sensing assembly in its forward position, and a short stem adjustment shaft on the assembly passes through the cover and the mounting plate when the assembly is in its forward and reverse positions, respectively.

A further object resides in the provision of a novel mounting base plate having the above structure and enabling the wall mounted humidistat to be placed flat upon the wall surface and the control assembly of the duct mounted humidistat to be spaced from the plate within the air duct.

Other objects and advantages will become apparent from the following detailed description and appended claims.

BRIEF DESCRIPTION OF THE DRAWING

FIG. 1 is an exploded perspective view of the novel, universal humidistat of the invention shown assembled as a wall mounted humidistat;

FIG. 2 is a similar exploded perspective view with the respective parts arranged for use as a duct mounted humidistat; and FIG. 3 is an elevation view along line 3—3 of FIG. 1 illustrating the bosses and knock-out apertures of the novel base plate.

DETAILED DESCRIPTION OF THE DRAWING

Referring now to FIG. 1, the respective parts are shown assembled as a wall mounted humidistat 10 having a humidity sensing assembly 12, a mounting base plate 14, and a cover 15 within which the assembly 12 is received and enclosed.

The humidity sensing assembly 12 includes a U-shaped housing 16 having aligned outwardly projecting, threadedly apertured lugs 18 on the front and back sides thereof, a slot 20 on the front side, and a plurality of apertures 21 along its base 23 (see FIG. 2). Housing 16 conventionally houses a humidity sensitive band 22, the length and tension of which changes with varying moisture content of the air, this change in band length causing corresponding opening and closing of electrical contacts located within insulated terminal block 24, which is positioned in the open end of housing 16, to control the flow of current through terminals 26 to a suitable electrical connecting cable (not shown) leading to a humidifier. An adjustment cam 30 mounted on shaft 32 which extends through slot 20 operates on a pivoted lever 34 connected to band 22 to initially adjust the length and tension of the band to a predetermined set point position. The described structure of the humidity sensing assembly 12 is conventional in existing wall mounted humidistats and is shown fragmentarily merely to illustrate the relative position and arrangement of the respective parts.

The mounting base plate 14 includes a pair of inwardly projecting apertured bosses 36, an aperture 38 and knock-out plugged holes 40 and 42. As shown in FIG. 1, when the device is assembled as a wall mounting humidistat, the knock-out plug 40 is adjacent the open end of housing 16 and terminals 26 and is removed to provide a through aperture receiving a rubber grommet 41 through which the electrical cable (not shown) connecting the terminals 26 to a humidifier may conveniently pass without interfering with ready assemblage of the unit 10. The knock-out plug 42 is adjacent the base 23 and remains intact and will be at least partially covered by the upper edge of assembly 12. Apertures 43 are provided to receive screws which may be used to mount the unit 10 on the wall 100.

As shown in FIG. 1, the assembly 12 is in a forward position so that the short stem shaft 32 extends through the cover aperture 44 when the assembly is enclosed within the cover 15 and connected thereto by screws 46 passing through recessed cover apertures 48 and threadedly engaging the front housing lugs 18.

The mounting plate 14 is connected to assembly 12 by similar screws 50 which pass through bosses 36 and threadedly engage the back housing lugs 18. The heads of the screws are received within the bosses so that the unit 10 and plate 14 may be mounted flatly against the level surface of wall 100.

An adjustment knob 52 is mounted and held on shaft 32 by a retainer snap ring 54 and may be provided with appropriate indicia to indicate the setting of the humidistat.

A thin metallic decorative nameplate 56 (FIG. 2) is laminated on the back of the base plate 14 and will have suitable holes aligning with the respective apertures in plate 14. The nameplate may be suitably marked with corresponding temperature and humidity tables to insure that the humidistat is properly set.

Referring now to FIG. 2, the respective parts are shown as assembled for use as a duct mounted humidistat and in this arrangement the cover 15 and screws 46 are not used and may be discarded. The position of the humidity sensing assembly 12 is merely reversed from that shown in FIG. 1 so that the short stem shaft 32 extends through the plate aperture 38 with the front housing lugs 18 engaging the bosses 36 and threadedly receiving screws 50 to hold the unit together. Because the bosses 36 engage the lugs 18, the sensing assembly 12 will be spaced from the base plate 14 when the plate is mounted on a wall of air duct 102 and will extend interiorly within the duct, thus improving the movement and distribution of the air over the sensing assembly.

The bosses 36 also compensate for the metal thickness of the air duct and enable the control assembly to be easily installed. If the bosses were not provided the plate 14 would fit flush against the housing 16 and the metal thickness of duct 102 would render installation difficult unless an exact sized hole without any burrs or rough cutting was provided in the duct.

In the duct mounted humidistat of FIG. 2 the knock-out plug 42 is adjacent the open end of housing 16 and terminals 26 and will be removed to receive the rubber grommet 41 and the connecting electrical cable, while the plug 40 will be retained in place and will be at least partially covered by the bottom edge of housing 16. The nameplate 56 laminated to the base plate 14 will again have suitable holes aligned with the apertures in plate 14.

It is thus apparent that the invention accomplishes the objects initially set forth by providing the above described simple, easily assembled universal humidistat readily adapted for use as a wall or duct mounted unit as desired by a purchaser.

Consequently, a manufacturer need only produce a single structural unit for each given size, useful for both purposes, thus resulting in decreased costs and a reduction in inventory and space requirements. This also enables a manufacturer to standardize production machinery and equipment and to stock as inventory only uniform, standardized parts.

Similarly, a distributor's inventory requirements are substantially reduced since the same humidistat may be sold for both wall and duct mounted applications.

Advantageously, an installer need not be concerned as in the past about any special installation problems which might be encountered, since the invention may be used for alternative applications.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A humidity control device comprising a substantially flat base plate, a humidity sensing assembly including adjusting means and electrical terminals [adapted to be connected to an electrical cable leading to a humidifier or dehumidifier], said assembly having forward and reverse positions and being removably connected to said base plate in both said positions, said plate having an opening with which said adjusting means aligns when said sensing assembly is in said reverse position and a plurality of cable receiving means through at least one of which *an electrical* [said] cable passes when said assembly is in said forward position and another when said assembly is in said reverse position, whereby said device may be used as a wall mounted humidistat when said assembly is in said forward position and as an air duct mounted humidistat when said assembly is in said reverse position.

2. A humidity control device as in claim 1, said base plate comprising bosses through which attachment means pass to connect said plate to said assembly, said bosses engaging said assembly and spacing said assembly from said plate so that when said assembly is in said reverse position and said device is used as an air duct mounted humidistat with said assembly located within the duct *and* [an] said plate located outside the duct the movement and distribution of the air within the duct over the assembly is improved.

3. A humidity control device as in claim 2, said attachment means comprising screws whose heads are received in said bosses to enable said base plate to be mounted flat against a level wall surface.

4. A humidity control device as in claim 1, said cable receiving means comprising readily removable knock-out plugs, said one and another plugs located on said plate to be respectively positioned adjacent said terminals when said assembly is in said forward and reverse positions, respectively.

5. A humidity control device as in claim 1, comprising a cover adapted to be removably connected to said assembly when it is in said forward position for mounting as a wall humidistat, said adjusting means adapted to pass through said cover, and a control knob connected to said adjustment means for movement thereof.

6. A humidity control device as in claim 5, said adjusting means being a shaft adapted to pass through said base plate opening when said assembly is in said reverse position for mounting as a duct humidistat.

[7. A base member for mounting a humidity control device including a humidity sensing assembly having electrical terminals and positionable in forward and reverse positions, comprising a substantially flat plate having a plurality of cable receiving means for an electric cable connected to said terminals, at least one of said cable receiving means being useful when said assembly is in said forward position and another when said assembly is in said reverse position, bosses through which attachment means may pass to connect said plate to said assembly, said bosses spacing said assembly from said plate when said assembly is in said reverse position, and aperture means through which an adjustment shaft of said assembly may pass to permit adjustment thereof.]

[8. A base member as in claim 7, said cable receiving means comprising readily removable knock-out plugs, said one and another plugs located in said plate to be respectively positioned adjacent said terminals when said assembly is in said forward and reverse positions, respectively.]

9. A humidity control device comprising a substantially flat base plate, a humidity sensing assembly including electrical terminals [adapted to be connected to an electrical cable leading to a humidifier or dehumidifier], said assembly having forward and reverse positions and being removably connected to said base plate in [both] *each of* positions, said plate having an opening and a plurality of cable receiving means, through at least one of which [said] *an electrical* cable passes when said assembly is in said forward position and another when said assembly is in said reverse position, said device being useful as a wall mounted and air duct mounted humidistat when said assembly is in said forward and reverse positions, respectively, said base plate comprising bosses through which attachment means pass to connect said plate to said assembly, said bosses engaging said assembly and spacing said assembly from said plate so that when said assembly is in said reverse position and said device is used as an air duct mounting humidistat the movement and distribution of the air within the duct over the assembly is improved, a cover [adapted to be] removably connected to said assembly when it is in said forward position, said assembly having adjusting means *passing* [adapted to pass] through said cover and a control knob connected to said adjustment means for movement thereof, said adjusting means also [adapted to pass] *passing* through said base plate opening when said assembly is in said reverse position for mounting as a duct humidistat.

10. A humidity control device as in claim 9, said cable receiving means comprising readily removable knock-out plugs, said one and another plugs located on said plate to be respectively positioned adjacent said terminals when said assembly is in said forward and reverse positions, respectively.

References Cited

The following references cited by the Examiner, are of record in the patented file of this patent or the original patent.

UNITED STATES PATENTS

| | | | |
|---|---|---|---|
| 3,193,641 | 7/1965 | Krueger | 200—61.06 |
| 1,488,669 | 4/1924 | Getchell | 174—52 R |
| 2,821,566 | 1/1958 | Wiley | 174—52 |
| 2,887,525 | 5/1959 | Lewus | 174—65 R |
| 3,180,920 | 4/1965 | Fletcher | 174—38 |

ROBERT K. SCHAEFER, Primary Examiner

G. P. TOLIN, Assistant Examiner

U.S. Cl. X.R.

200—61.06; 174—52 R; 324—156; 312—31.02

UNITED STATES PATENT OFFICE
CERTIFICATE OF CORRECTION

Patent No. Re 28,154 Dated September 10, 1974

Inventor(s) Walter R. Stiles

It is certified that error appears in the above-identified patent and that said Letters Patent are hereby corrected as shown below:

Col.1, line 23, change "and" to --an--,

Col.4 line 38, after "provided" insert a --,--

Col.5 line 13, after "in" both should be in brackets; after "(both)" insert --each of--

Signed and sealed this 10th day of December 1974.

(SEAL)
Attest:

McCOY M. GIBSON JR.
Attesting Officer

C. MARSHALL DANN
Commissioner of Patents